(12) United States Patent
Hynecek et al.

(10) Patent No.: US 6,266,087 B1
(45) Date of Patent: Jul. 24, 2001

(54) CIRCUIT AND TECHNIQUE FOR SMEAR SUBTRACTION IN CCD IMAGE SENSORS

(75) Inventors: Jaroslav Hynecek, Richardson; Matthew J. Fritz, Plano, both of TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 08/411,033

(22) Filed: Mar. 27, 1995

(51) Int. Cl.[7] ................ H04N 3/14; H04N 9/64
(52) U.S. Cl. ............ 348/249; 348/312; 348/314; 348/317; 257/223; 257/230; 257/247
(58) Field of Search .......................... 257/223, 230, 257/247; 348/241, 248, 249, 250, 311, 314, 315, 316, 317, 319, 320, 321, 322, 323; H04N 5/335, 9/64, 3/14

(56) References Cited

U.S. PATENT DOCUMENTS

| | | | |
|---|---|---|---|
| 4,490,744 | * 12/1984 | Levine | 358/213 |
| 4,581,651 | * 4/1986 | Miyata | 358/213 |
| 4,782,394 | * 11/1988 | Hieda et al. | 358/213.19 |
| 4,949,183 | * 8/1990 | Stevens | 358/213.23 |
| 5,089,894 | * 2/1992 | Higashitsutsumi | 358/213.24 |
| 5,130,774 | * 7/1992 | Stevens et al. | 357/24 |
| 5,298,734 | * 3/1994 | Kokubo | 250/208.1 |
| 5,430,481 | 7/1995 | Hynecek | 348/317 |
| 5,453,632 | * 9/1995 | Hynecek et al. | 257/247 |
| 5,464,996 | * 11/1995 | Hynecek | 257/230 |

* cited by examiner

Primary Examiner—Wendy R. Garber
Assistant Examiner—Ngoc-Yen Vu
(74) Attorney, Agent, or Firm—Alan K. Stewart; Wade James Brady, III; Frederick J. Telecky, Jr.

(57) ABSTRACT

The image sensing device includes an image sensing area 22 having an antiblooming drain structure; and a frame memory area 24 coupled to the image sensing area 22 for storing charge from the image sensing area, wherein during charge integration, the antiblooming drain is biased at a first level, and during charge transfer to memory, the antiblooming drain is biased at a second level such that the image sensing area 22 will have a higher charge capacity than during the charge integration.

13 Claims, 3 Drawing Sheets

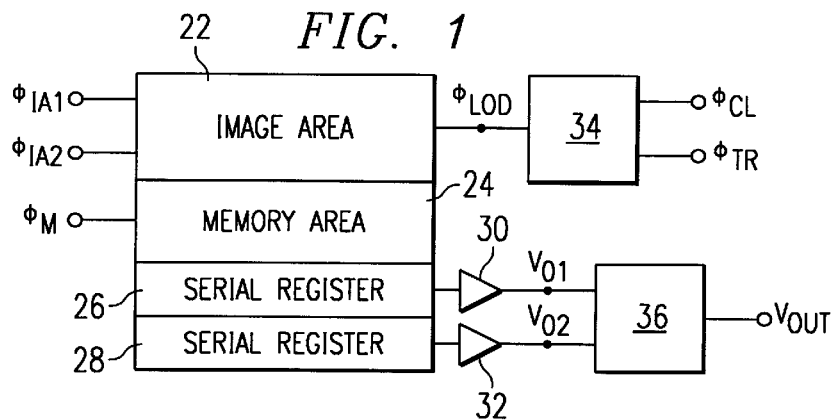
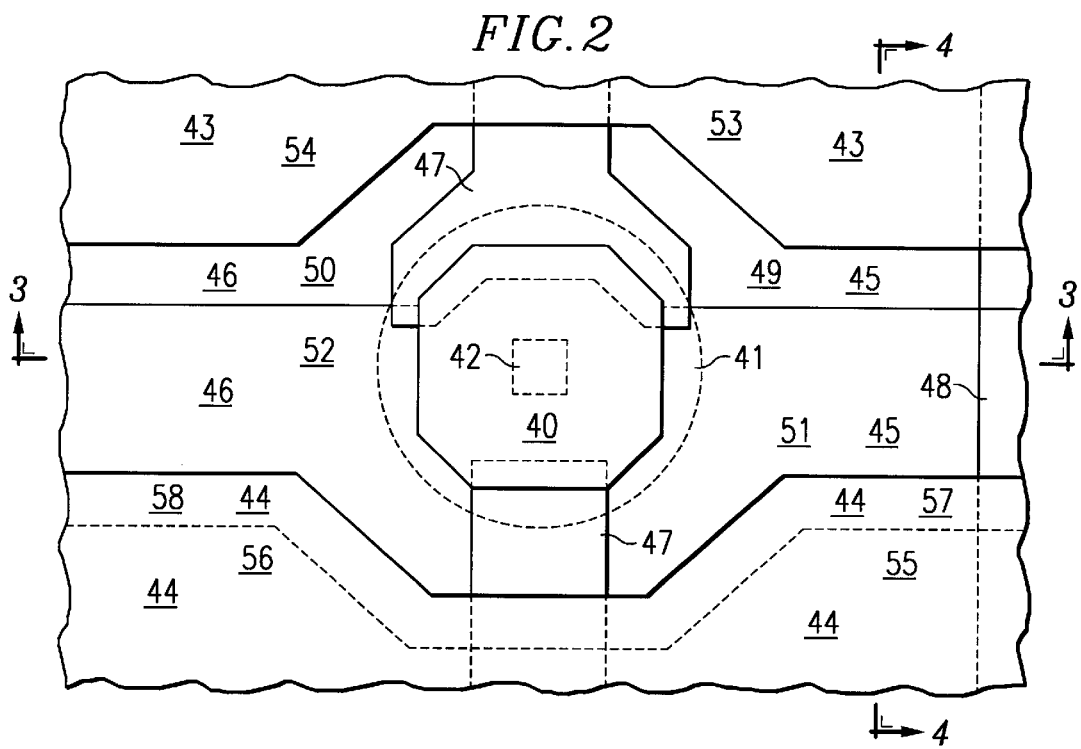
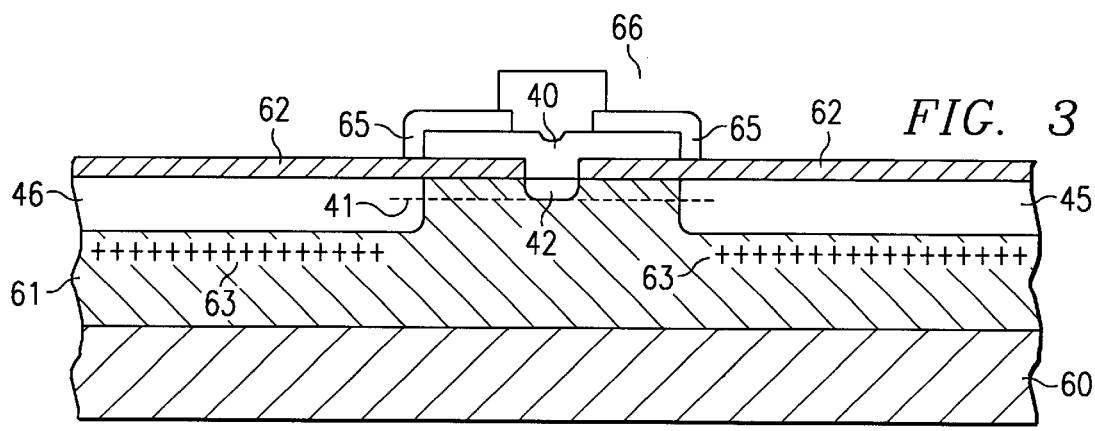

CIRCUIT AND TECHNIQUE FOR SMEAR SUBTRACTION IN CCD IMAGE SENSORS

CROSS-REFERENCE TO RELATED APPLICATIONS

Ser. No. 08/220,145; Filing Date Mar. 30, 1994; TI Case No. TI-19090.

FIELD OF THE INVENTION

This invention relates generally to image sensors, and more specifically to charge coupled devices.

BACKGROUND OF THE INVENTION

Smear is an unwanted phenomenon in charge coupled device (CCD) image sensors which occurs when charge is transferred from the image sensing area to the memory area. Smear is the result of charge generation in the imaging area during this transfer. Since the charge transfer speed is finite, charge generated by a bright source is added to the wrong pixels during the transfer. As charge from a particular pixel in the image area is shifted through other pixels on the way to the memory area, the light source continues to generate additional charge in these other pixels. This additional charge adds to the original amount of charge to distort the image signal. Smear is the result of this additional charge.

SUMMARY OF THE INVENTION

Generally, and in one form of the invention, the image sensing device includes an image sensing area having an antiblooming drain structure; and a frame memory area coupled to the image sensing area for storing charge from the image sensing area, wherein during charge integration, the antiblooming drain is biased at a first level, and during charge transfer to memory, the antiblooming drain is biased at a second level such that the image sensing area will a higher charge capacity than during the charge integration.

BRIEF DESCRIPTION OF THE DRAWINGS

In the drawings:

FIG. 1 is a schematic block diagram of a preferred embodiment imager with smear clip circuit and differential amplifier, and an antiblooming driver;

FIG. 2 is a plan view of a lateral overflow antiblooming drain;

FIG. 3 is a cross sectional view of the lateral overflow antiblooming drain;

Corresponding numerals and symbols in the different figures refer to corresponding parts unless otherwise indicated.

DETAILED DESCRIPTION OF PREFERRED EMBODIMENTS

Figure 4:
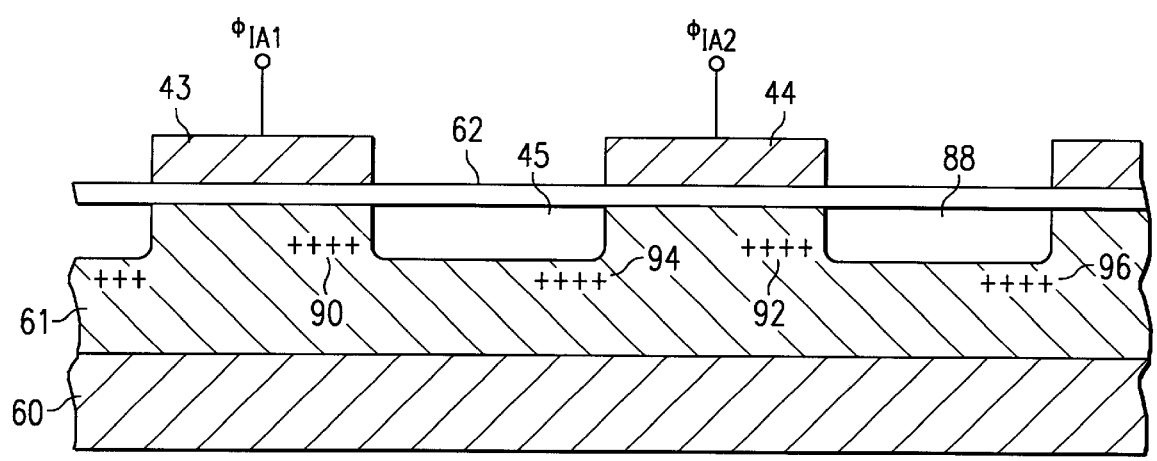
FIG. 4 is a cross sectional view of the device of FIG. 2 showing a virtual phase CCD pixel area of the imager of FIG. 1.

A schematic block diagram representation of the basic sensor system architecture for the frame transfer device with the smear clip circuit and differential amplifier and the antiblooming driver is shown in FIG. 1. The device in FIG. 1 includes two phase image sensing area 22, single phase frame memory area 24, dual serial registers 26 and 28, charge detection amplifiers 30 and 32, overflow antiblooming drain clocked signal $\phi_{LOD}$, first image area gate clocked signal $\phi_{IA1}$, second image area gate clocked signal $\phi_{IA2}$, output from first serial register $V_{o1}$ (image signal and smear), output from second serial resister $V_{o2}$ (smear only), memory area gate clocked signal $\phi_M$, antiblooming driver circuit 34, clear pulse $\phi_{CL}$, transfer pulse $\phi_{TR}$, differential amplifier with smear clip circuit (smear substraction circuit) 36, and video output $V_o$.

In the preferred embodiment, the image sensing area 22 is composed of 500 lines. Each line has a total of 680 pixels. For image capture of two interlaced TV fields non-simultaneously, charge integrated in the 500 lines in the image sensing area 22 is summed into 250 lines with every signal line followed by an empty line, or charge in every other line is cleared. Charge summing is altered to provide both TV fields "A" and "B", or the charge clearing of every other line is altered to provide both TV fields. For field "A", line 2 is summed with line one, line 4 is summed with line 3, etc. For field "B", line 3 is summed with line 2, line 5 is summed with line 4, etc. This procedure accomplishes electronic centroid shift and thus electronic interlace.

Referring to FIG. 2, a plan view of a lateral overflow drain antiblooming structure is shown. The antiblooming structure shown in FIG. 2 includes drain electrode 40, threshold adjust implants 41, N+ region (drain) 42, clocked gates 43 and 44, virtual gates 45 and 46, channel stops 47 and 48, virtual barriers 49 and 50 below the virtual gates, virtual wells 51 and 52 below the virtual gates, clocked wells 53, 54, 55 and 56 below the clocked gates, and clocked barriers 57 and 58 below the clocked gates. The antiblooming structure is formed at a face of a P type semiconductor substrate or layer. The antiblooming structure is surrounded by virtual phase charge coupled device (CCD) cells arranged in a plurality of rows and columns. The semiconductor layer is preferably a semiconductor substrate, but can take other forms such as an epitaxial layer.

FIG. 3 is a cross-section of the lateral overflow drain shown in FIG. 2. The structure of FIG. 3 includes a P type silicon layer 60, an N type layer 61 in the layer 60, P+ virtual gates 45 and 46 formed in the upper portion of N type layer 61, N+ drain (lateral drain) 42, gate insulator layer 62, drain electrode 40, virtual well donor implants 63 in the N type layer 61, threshold adjust implant 41 below the drain electrode 40, insulator layer 65, and drain interconnect (conductive interconnect) 66.

FIG. 4 is also a cross section of the device of FIG. 2. FIG. 4 shows a portion of the virtual phase charge coupled device (CCD) charge transfer channel. The cross section includes an odd and even pixel from the image sensing area 22 of FIG. 1. The direction of charge transfer in the device of FIG. 4 is from left to right. This corresponds with charge transfer in the direction from top to bottom in the image sensing area 22 of FIG. 1. The virtual phase CCD of FIG. 4 includes odd gate 43, even gate 44, virtual gates 45 and 88, donor implants 90, 92, 94, and 96, N type semiconductor region 61, P type semiconductor region 60, and insulator layer 62. Virtual gate 88 is not shown in FIG. 2.

Figure 5:
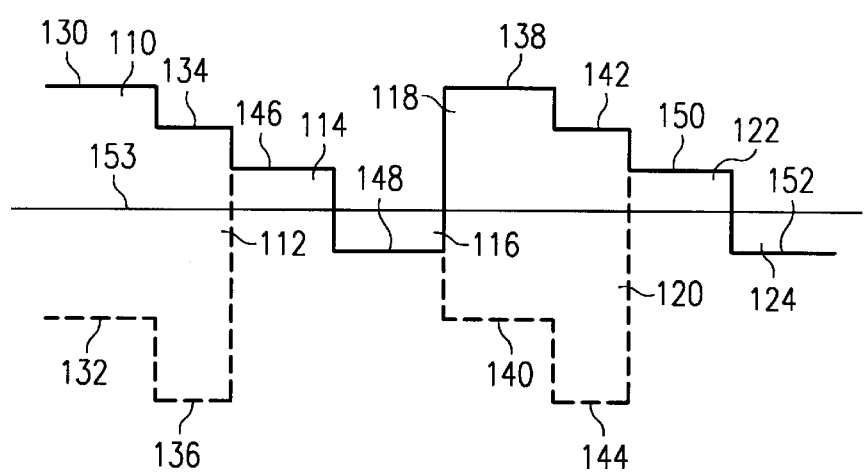
FIG. 5 is a potential diagram illustrating the operation of the device in FIG. 4 in moving charge from a first pixel area to an adjacent second pixel area.

FIG. 5 shows the potential levels for each region in the device of FIG. 4. The odd clocked well 110 and odd clocked barrier 112 are at potential levels 136 and 132 when the odd gate 43 is at a high potential level, and at potential levels 134 and 130 when the odd gate 43 is at a low potential level. The even clocked well 120 and even clocked barrier 118 are at potential levels 144 and 140 when the even gate 44 is at a high potential level, and at potential levels 142 and 138 when the even gate 44 is at a low potential level. The virtual barrier 114 is at potential level 146. The virtual well 116 is at potential level 148. The virtual barrier 122 is at potential level 150. The virtual well 124 is at potential level 152. The line 153 indicates the potential level of the antiblooming barrier during charge integration. image sensing area 22 is coupled to three clock signals, $\phi_{LOD}$, $\phi_{IA1}$, and $\phi_{IA2}$, shown in FIG. 8. $\phi_{LOD}$ is coupled to the lateral overflow drain of each pixel area. $\phi_{IA1}$ is coupled to the gate electrodes of pixel areas in field "A". $\phi_{IA2}$ is coupled to the gate electrodes of pixel areas in field "B". By using in-phase clocking of $\phi_{IA1}$ and $\phi_{IA2}$, charge sensed during an integration period can be transferred down columns to the memory area 24. For charge clearing operations, $\phi_{IA}$ and $\phi_{IA2}$ are held at a low voltage while $\phi_{LOD}$ is clocked to a high voltage (12 volts). During charge integration periods, $\phi_{LOD}$ is held at an intermediate voltage (8 volts) to create a suitable anti-blooming barrier with an adjacent drain. During charge transfer to memory, $\phi_{LOD}$ is clocked to a low voltage (3 volts) to increase the charge holding capacity of the wells and thus also contain the smear information.

The image area 22 is completely cleared of any charge prior to charge integration. This is accomplished by using the lateral overflow antiblooming (AB) drain structure in each pixel. $\phi_{LOD}$ is clocked high (12 volts) to lower the antiblooming barrier and to clear the charge from the image sensing area 22.

During charge integration, the odd gates and even gates are held at a low potential so that charge collects in the virtual wells. After the charge integration period, the charge summing is accomplished by pulsing either the odd gates or the even gates before the transfer into memory area 24, depending on whether field "A" or field "B" is desired. For example, if the odd gates are pulsed from low to high to low, charge in the virtual well adjacent the odd clocked barrier will be shifted to the next virtual well in the direction of charge transfer. This combines charge from the two virtual wells into one virtual well and leaves the other virtual well empty of image signal. Looking at FIG. 5, if the odd gate 82 is pulsed, the charge in the virtual well to the left of odd clocked barrier 110 will be shifted to virtual well 116 and combined with the charge in virtual well 116. Charge in virtual well 124 will be shifted to the next virtual well (not shown) to the right of virtual well 124. After charge has been summed into every other line, it is then transferred to the memory area 24 and read out. Then, after the next charge integration period, the even gates are pulsed instead of the odd gates to accomplish an electronic centroid shift to provide interlace. In this way, the interlaced fields "A" and "B" are provided.

After charge summing in the image area 22, all lines are transferred into memory area 24, which consists of 500 lines with 680 pixels in each line. Memory area 24 may be fabricated with the virtual phase CCD device described above and clocked in phase, although the virtual phase devices described in applicant's U.S. Pat. No. 4,229,752, and entitled "Virtual Phase Charge Transfer Device", issued Oct. 21, 1980 will work perhaps more efficiently, as the memory phase area is not exposed to incident light and it is therefore unnecessary to provide either the charge clearing mechanism or the antiblooming gate mechanism to the devices in this area. Therefore, the memory area 24 of the preferred embodiment, shown in FIG. 1, requires only one clock signal, $\phi_M$.

Smear occurs during the transfer of charge from the image area 22 to the memory area 24. Smear is the result of charge generation in the imaging area 22 during the transfer of charge from the imaging area 22 to the memory area 24. When the image information is transferred from the image area 22 to the memory area 24, the lines that contain no image signal after charge summing will contain charge resulting from smear. The lines containing image signal will also contain charge resulting from smear. The smear information in the empty lines can then be used to determine the amount of smear in the lines containing image signal and smear. Since the smear information is contained in every other line in the memory, the smear information can be read out simultaneously with the corresponding image signal information by using the dual serial registers 26 and 28. For example, serial register 26 can be used to read the lines containing both image signal and smear information and serial register 28 can be used to read the lines containing only smear information. Subtraction of the smear information from the image signal is accomplished by the differential amplifier with clip circuit 36 on a pixel by pixel basis. The output $V_o$ is the smear-less image signal.

The simple smear subtraction concept is complicated by the antiblooming feature built into the sensor to eliminate charge spill into the neighboring pixels in overloaded areas. The antiblooming level during charge integration is determined by the antiblooming drain bias $\phi_{LOD}$ and is set to approximately less than one half of the virtual well potential, as shown by line 153 in FIG. 5. If a strong light signal generates more charge than the preset level, charge is drained away from the pixel by the lateral overflow drain structure shown in FIG. 2.

Figure 6:
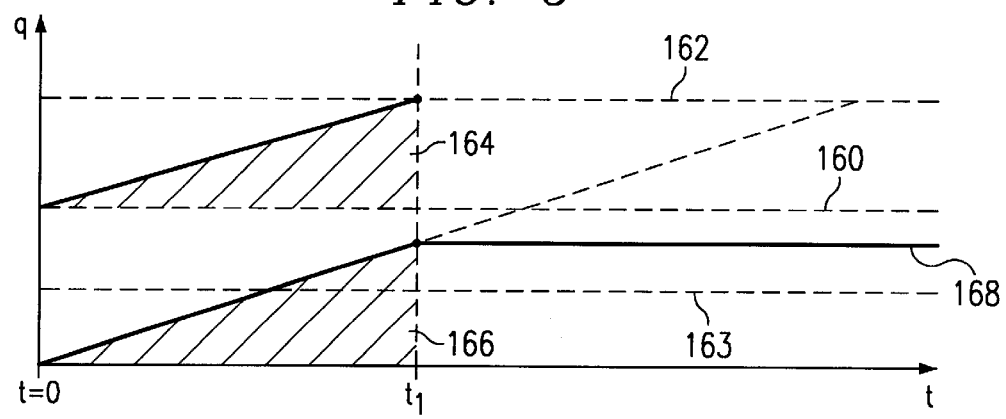
FIG. 6 is a diagram of smear and image signal levels.

In order to collect the smear data, it is necessary to momentarily lower the antiblooming drain bias $\phi_{LOD}$ to allow the smear data to add to the image signal. If the antiblooming drain bias $\phi_{LOD}$ is not lower during charge transfer, smear signal will be lost. The antiblooming levels during charge integration and charge transfer are shown in FIG. 6. FIG. 6 shows the charge integration antiblooming level 160, the charge transfer antiblooming level 162, the image signal level before charge summing 163, smear 164 in the signal channel when the image signal level after charge summing is at the antiblooming level 160, smear 166 in the empty channel, and smear clip level 168. The vertical axis in FIG. 6 represents total charge level. The horizontal axis in FIG. 6 represents the time or number of transfers. The time t=0 is when the charge transfer to memory begins.

Figure 7:
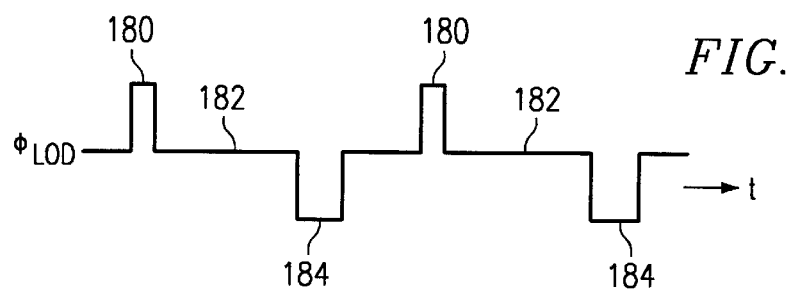
FIG. 7 is a timing diagram of the antiblooming drain bias.

A diagram of the antiblooming drain bias $\phi_{LOD}$ is shown in FIG. 7. First, a charge clearing pulse 180 (12 volts in the preferred embodiment) clears all charge from the pixel. Next, for the charge integration period, the drain is biased at level 182 (8 volts in the preferred embodiment) to provide a suitable antiblooming barrier. Then, for the charge transfer to memory period, the drain is biased at level 184 (3 volts in the preferred embodiment) to allow a higher charge capacity in the charge storage wells. This mode of operation preserves the smear data on top of the signal in one channel and the corresponding smear signal in the other channel. Then after charge conversion to voltage at the output amplifiers 30 and 32, the smear is subtracted from the signal to obtain a smear-less image.

Figure 8:
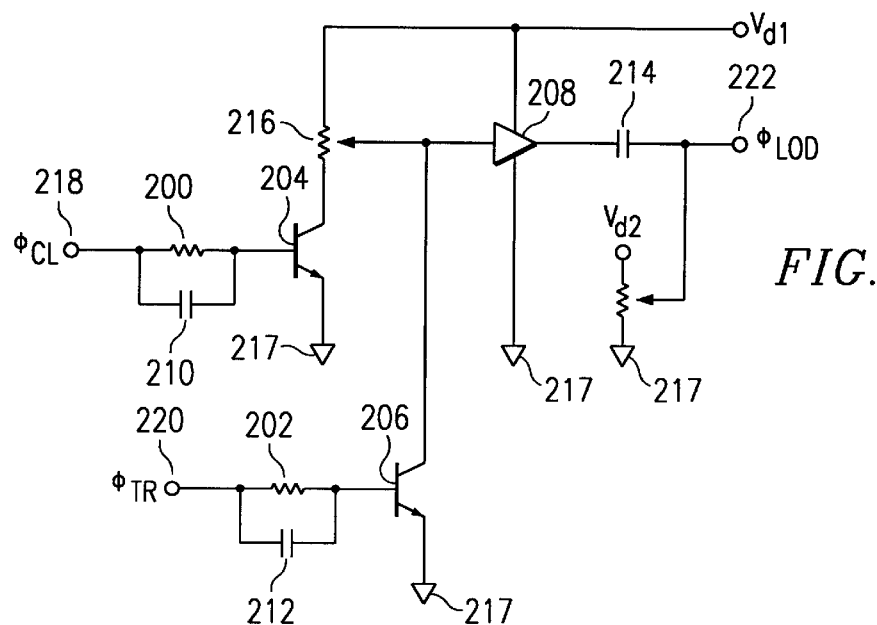
FIG. 8 is a circuit diagram of a preferred embodiment antiblooming tri-level driver circuit.

A preferred embodiment antiblooming tri-level driver circuit is shown in FIG. 8. This corresponds with circuit 34 shown in FIG. 1. The circuit includes resistors 200 and 202, transistors 204 and 206, unity gain buffer 208, capacitors 210, 212, and 214, potentiometer 216, and common node 217. $\phi_{CL}$ is input into node 218. $\phi_{TR}$ is input into node 220.

$\phi_{LOD}$ is provided at node 222. In the preferred embodiment, $V_{d1}$ is 12 volts relative to common node 217, $V_{d2}$ is 12 volts relative to common node 217, and the voltage at node 222, relative to common node 217, is 8 volts when no current is flowing through capacitor 214. $\phi_{CL}$ is pulsed low to provide the charge clearing pulse 180 in FIG. 7. $\phi_{TR}$ is pulsed high to provide bias level 184 in FIG. 7.

Since the smear channel does not carry any signal, it can hold much larger smear values than the channel containing image signal and smear. This situation occurs after time $t_1$ in FIG. 6. When subtraction is implemented after time $t_1$, over subtraction will occur (negative resulting signal is possible). This will lead to an unpleasant (black) image in the illuminated area. The solution is to "clip" (limit) the output from the smear channel at a level corresponding to the maximum smear level in the image signal channel.

Figure 9:
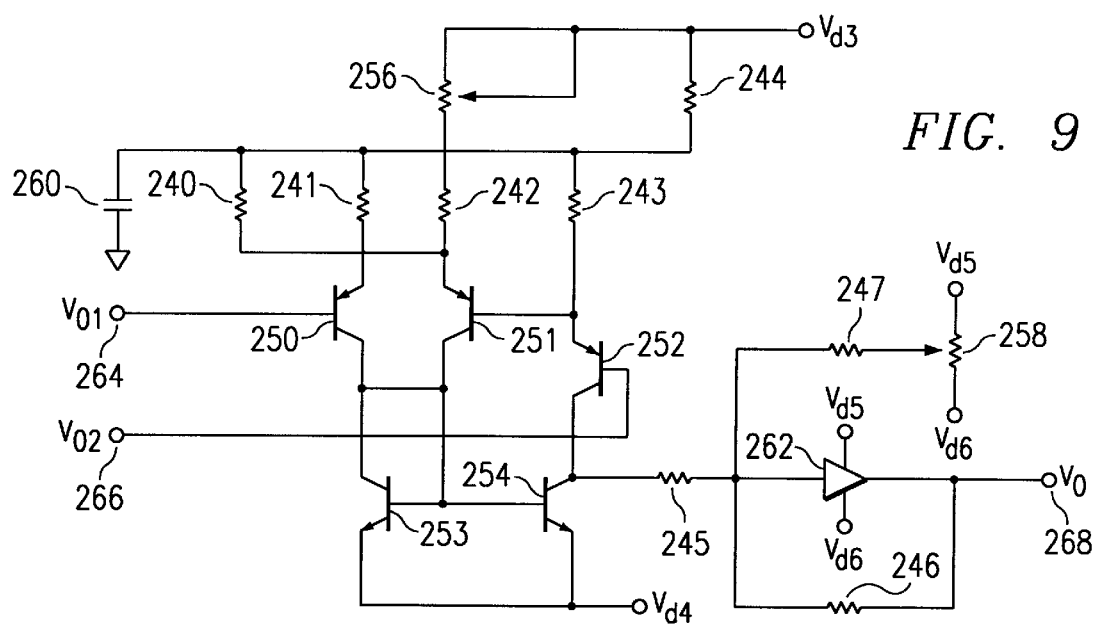
FIG. 9 is a circuit diagram of a preferred embodiment differential amplifier with a smear clip circuit.

A preferred embodiment differential amplifier with smear clip circuit is shown in FIG. 9. This corresponds with circuit 36 shown in FIG. 1. The circuit in FIG. 9 includes resistors 240–247, transistors 250–254, potentiometers 256 and 258, capacitor 260, and amplifier 262. $V_{o1}$ is coupled to node 264. $V_{o2}$ is coupled to node 266. $V_o$ is provided at node 268. In the preferred embodiment, $V_{d3}$ is 22 volts, $V_{d4}$ is −5 volts, $V_{d5}$ is 5 volts, $V_{d6}$ is 5 volts, resistor 240 is 100 ohms, resistor 241 is 150 ohms, resistor 242 is 4 K ohms, resistor 243 is 150 ohms, resistor 244 is 2.5 k ohms, resistor 245 is 100 ohms, resistor 246 is 1.5 k ohms, and resistor 247 is 1 k ohms, potentiometer 256 is 2 k ohms, and potentiometer 258 is 5 k ohms. Potentiometer 256 is used to adjust the clip level 168 in FIG. 6. Resistors 245–247, operational amplifier 262, and potentiometer 258 are connected in an inverting mode with low impedance inputs. A current feedback amplifier can be used in place of operational amplifier 262.

The circuit in FIG. 9 operates as follows. Transistors 250 and 252 represent PNP source followers which convert the input voltages $V_{o1}$ and $V_{o2}$ into corresponding currents. The conversion factors are determined by the value of resistors 241 and 243. The current from the collector of transistor 250 is mirrored by the current mirror formed by transistors 253 and 254. This provides the current signal substraction at the inverting input node of the operational amplifier 262. The resistor 245 is not necessary and serves only as a bandpass limiter. When the smear level at the emitter of transistor 252 exceeds certain limits, transistor 251 is turned on and its signal is added to the output of transistor 250. This provides the clipping function which prevents the over substraction of the smear signal. The threshold at which the clipping occurs is determined by the value of resistors 240 and 242, and potentiometer 256.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An image sensing device comprising:
   an image sensing area having a lateral overflow antiblooming drain structure; and
   a frame memory area coupled to the image sensing area for storing charge from the image sensing area, wherein during charge integration, the antiblooming drain is biased at a first level, and during charge transfer to memory, the antiblooming drain is biased at a second level such that the image sensing area will have a higher charge capacity than during the charge integration.

2. The device of claim 1 further comprising:
   a first serial register coupled to the memory area for receiving charge from the memory area; and
   a second serial register coupled to the first serial register for receiving charge from the first serial register.

3. The device of claim 2 further comprising:
   a first charge detection amplifier coupled to the first serial register; and
   a second charge detection amplifier coupled to the second serial register.

4. The device of claim 3 further comprising:
   a smear subtraction circuit coupled to the first and second charge detection amplifiers for limiting an output from one of the charge detection amplifiers to a maximum level and then subtracting that output from an output of the other charge detection amplifier.

5. The device of claim 1 wherein the antiblooming drain is biased at a third level for clearing charge from the image sensing area.

6. The device of claim 1 wherein the antiblooming drain is biased by an antiblooming driver circuit.

7. The device of claim 6 wherein the antiblooming driver circuit comprises:
   a first input node coupled to a first transistor;
   a second input node coupled to a second transistor;
   an amplifier having an input coupled to the first and second transistors, and an output coupled to the antiblooming drain; and
   a potentiometer coupled to the antiblooming drain.

8. A method for detecting smear in an image sensing device comprising:
   forming a lateral overflow antiblooming barrier at a first level in an image sensing area;
   accumulating charge generated by incident light in a plurality of image rows in the image sensing area;
   switching the antiblooming barrier to a second level such that the image sensing area can hold more charge generated by incident light than with the antiblooming barrier at the first level; and
   transferring charge in the image sensing area to a memory area.

9. The method of claim 8 further comprising transferring charge in the memory area to dual serial registers.

10. The method of claim 9 further comprising reading out smear signal from a first of the dual serial registers and a combination of image signal and smear signal from a second of the dual serial registers.

11. The method of claim 10 further comprising subtracting the smear signal from the combination of image signal and smear signal.

12. The method of claim 10 further comprising limiting the smear signal from the first of the dual serial registers to a maximum level to provide a clipped smear signal.

13. The method of claim 12 further comprising subtracting the clipped smear signal from the combination of image signal and smear signal.

* * * * *